UNITED STATES PATENT OFFICE.

JOHN MILLER, OF PHILADELPHIA, PENNSYLVANIA.

IMPROVEMENT IN LEATHER-DRESSING.

Specification forming part of Letters Patent No. 165,680, dated July 20, 1875; application filed January 8, 1875.

*To all whom it may concern:*

Be it known that I, JOHN MILLER, of the city and county of Philadelphia, and State of Pennsylvania, have invented a new and useful Improvement in Leather-Dressing; and I do hereby declare the following to be a clear and exact description of the nature thereof, sufficient to enable others skilled in the art to which my invention appertains to fully understand, make, and use the same.

My invention consists in forming a body for the dressing of a solution of leather.

In carrying out my invention I take scraps or pieces of leather, say one pound, and soda or other alkali, one-half pound. The leather is added to a solution of soda or alkali in warm water, and thus dissolves, forming a glutinous mass, which constitutes the body of the dressing, to which will be added a coloring material—say, bichromate of potash, say three drams, and extract of logwood, four ounces, these making together about one gallon of black dressing.

The color may be varied by the employment of different coloring matters.

Having thus described my invention, what I claim as new, and desire to secure by Letters Patent, is—

The composition of matter consisting of a solution of leather and coloring material, substantially as and for the purpose set forth.

JOHN MILLER.

Witnesses:
JOHN A. WIEDERSHEIM,
A. P. GRANT.